United States Patent [19]

Uzunoglu

[11] 4,438,355

[45] Mar. 20, 1984

[54] PHASE CANCELLER FOR CARRIER RECOVERY NETWORK

[75] Inventor: Vasil Uzunoglu, Ellicott City, Md.

[73] Assignee: Communications Satellite Corporation, Washington, D.C.

[21] Appl. No.: 375,603

[22] Filed: May 6, 1982

Related U.S. Application Data

[62] Division of Ser. No. 134,735, Mar. 27, 1980, Pat. No. 4,368,542.

[51] Int. Cl.³ .................... H03K 5/153; H03K 3/26
[52] U.S. Cl. ................................... 307/511; 307/303
[58] Field of Search .............. 307/511, 299 R, 309, 307/262, 303, 304

[56] References Cited

U.S. PATENT DOCUMENTS

| | | | |
|---|---|---|---|
| 3,585,462 | 6/1971 | Lehovec | 307/303 |
| 3,634,780 | 1/1972 | Bosch | 307/309 |
| 3,693,056 | 9/1972 | Paschke | 307/307 |
| 3,902,187 | 8/1975 | Engeler et al. | 377/61 |
| 3,955,100 | 1/1976 | Takahashi et al. | 377/57 |
| 4,002,930 | 1/1977 | Miura | 307/303 |

Primary Examiner—John S. Heyman
Assistant Examiner—Timothy P. Callahan
Attorney, Agent, or Firm—Sughrue, Mion, Zinn, Macpeak and Seas

[57] ABSTRACT

A phase canceller for a carrier recovery network (CRN) to cancel phase shifts associated with the band pass filter in the network. The canceller is a semiconductor device receiving an input signal at one junction to cause emitted carriers to migrate to a collector at a controlled rate determined by an applied electric field between a pair of ohmic contacts located between emitter and collector junctions with the field control by a signal from a phase detector in the AFC loop of the CRN.

6 Claims, 3 Drawing Figures

PHASE CANCELLER FOR CARRIER RECOVERY NETWORK

This is a division of application Ser. No. 134,735 filed Mar. 27, 1980 now U.S. Pat. No. 4,368,542.

BACKGROUND OF THE INVENTION

This invention relates to a semiconductor device operating as a phase canceller. In particular, the invention is related to a phase canceller for use in a carrier recovery network (CRN) of a time division multiple access transmission system (TDMA).

In such systems, the burst-to-burst frequency change may be in the order of ±5 k Hz. In the carrier recovery network, even if the automatic frequency control of the CRN cannot track these frequency variations, a 64-MHz band pass filter (BPF) will be responsive to those frequency variations together with phase shifts associated with them. In the case of utilizing high-Q filters, the phase shifts associated with such frequency variations may be as high as several degrees. Accordingly, in TDMA operation the bit error rate (BER) can be in the order of 1 dB. Accordingly, in such systems high loop gains are necessary to keep the phase error within acceptable limits.

In order to compensate for phase variations a phase-cancelling network can be inserted into the CRN loop. Such a loop is shown in FIG. 1. FIG. 1 shows a 70 MHz IF input signal delivered to a multiplier 12 with the input signals multiplied by 4 to generate a 280 MHz output signal. That signal is fed to a junction point 14 receiving the 280 MHz signal and also the output from a 54 MHz voltage controlled oscillator (VCXO 16) whose output is delivered to a multiplier section 18 thereby supplying a second input signal of 216 MHz to the junction point 14. The two signals are subtracted to derive a 64 MHz signal delivered to band pass filter 20.

The carrier recovery network shown in FIG. 1 then utilizes a threshold detector 22 as a portion of an automatic frequency control loop (AFC) together with phase detector 24 and amplifier 26. The phase detector 24 receives two input signals, one the output of summer 14 and the second the output of the threshold detector 22 to produce a control signal for the voltage controlled oscillator 16 to control frequency variation and hold the system at 64 MHz.

As indicated, the phase canceller of this invention is inserted into the CRN to compensate for phase variations and receives a control signal which is the output of the phase detector 24. The phase canceller 28 will be described in greater detail in the description of the preferred embodiment of this invention which follows. Its output is supplied to a divide by 4 divider 30 thereby producing a 16 MHz carrier signal. That output is added to the 54 MHz signal from oscillator 16 to produce, that is, recover the 70 MHz RC carrier signal.

Given this background of use of the phase canceller in accordance with the present invention, in general, the phase canceller can be defined as a constant resistance network operating as a linear phase shifting element. It can be defined by the transfer function $G(s)=P_1(s)/P^*_2(s)$, where $P_1(s)$ is the complex conjugate of $P_2(s)$. That is, $$|P_1(s)| = |P_2(s)|$$

$$\arg^* P_1(s) = -\arg P_2(s)$$

It follows then that, $$|G(s)| = 1 \text{ for all of } \omega \text{ and}$$

$$\phi(\omega) = \arg G(s)$$

The network approximation of such a constant resistance network lies in finding a sensor element within the network that will change the parameters according to the phase error without disturbing the constant resistance structure. Moreover, constant resistance networks require a large number of circuit elements and usually are symmetrical structures which impose further difficulties in terms of substantive realization.

A linear shifting element can be approximated by a semiconductor device having the characteristics of a constant resistance network. Any semiconductor amplifying element, bipolar or field effect structure, acts as a delay element. For example, in conventional bipolar transistor elements minority carriers emitted from the emitter must cross the base region before they are collected by the collector. In the case of a FET, the same analogy is true since a finite time is needed for the carriers to travel from the source to the drain of such a field effect transistor. The velocity of the carriers and the distance between the emitter and the collector determine the time of travel. The distance between the emitter and collector can be selectively varied, that is increased or decreased, to satisfy the required phase shift for a given voltage. Increased distance results in increased attenuation. Attenuation however can be compensated by appropriate amplification. Similarly, for a given distance the electric field between the emitter and collector can be varied to alter the travel time.

Within the prior art a variety of semiconductor devices are known however, one operating as a phase shifting device in accordance with the criteria set forth above is not known. For example, U.S. Pat. No. 3,714,473 shows a charge carrier beam deflection device, that is a semiconductor device capable of controllably deflecting the charge carrier beam in a semiconductor material by applying an electric or magnetic field to the semiconductor material. FIGS. 1 and 2 of the '473 patent show such a semiconductor device utilizing plainer geometry PIN semiconductor structure with material zones 12 and 13 and deflector electrodes 15.1–15.4. A voltage source is shown as element 18 and a signal source as element 17.5. In operation, the signal source 17.5 provides an input signal at electrode 13.1 contacting zone 13. The presence or absence of the charge carrier beam in a semiconductor material is detected at the detector electrodes 15.1–15.4 depending on the voltage applied by the source 18 across the metal electrode 14. Metal electrode 14 is disposed in the P zone 12 and the contact 12.1 is located in the N+zone 13. Accordingly, in this semiconductor device a charge carrier beam in the semiconductor material is controlled by an applied voltage at ohmic contacts in the material. The patent however does not perceive of phase shifting a signal where phase change can be varied by changing the electric field applied between emitter and collector by varying the voltage applied across the ohmic contacts.

U.S. Pat. No. 3,810,049 relates to an integrated attenuation element having a semiconductor body 1 with zones 4, 5, and 6 of a P-type material in a zone 15 of an N-type material embedded in a semiconductor body 1.

In operation, a high frequency input signal is provided at a contact electrode 7 in zone 4 and the output of this signal is detected at contact electrode 8 in zone 5. A voltage applied at terminal 47, connected to contact electrode 9 in zone 6 is used to control the attenuation of the high frequency signal transferred from input zone 4 to output zone 5. The patent, describes in column 4 lines 28–66 the characteristics of this semiconductor device wherein, the voltage applied at terminal 47 is capable of controlling the attenuation of the high frequency signal passing through the element. Accordingly, the −049 patent shows a device utilizing a control voltage to vary the characteristics of a high frequency signal passing through a semiconductor material. The patent however does not teach the concept of phase shifting the signal.

A number of other patents have been studied but are deemed to be structurally dissimilar from the present invention and not related to the function of linear phase shifting of a signal. Typical, are U.S. Pat. Nos. 4,032,916; 4,132,966; 3,313,952; 3,693,056; and 3,404,327, which all teach semiconductors wherein a voltage is applied to the semiconductor device to create an electric field within the device and thereby control the charge carrier flow to provide a variety of capabilities. Also, U.S. Pat. Nos. 3,649,847; 3,590,285; 3,808,517; and 4,122,364 teach generalized circuits for voltage control phase shifting of an electric signal. These patents however do not show a device related to a semiconductor phase shifter.

SUMMARY OF THE INVENTION

Given the deficiencies of the prior art, it is an object of this invention to provide a semiconductor device having the characteristics of a constant resistance network and operating as a linear phase shifting element.

Yet another object of this invention is to provide a phase canceller for a carrier recovery network that is inexpensive and easily manufactured.

A still further object of this invention is to provide a linear phase shifting element useable in a carrier recovery network for purposes of phase cancellation.

A further object of this invention is to provide a semiconductor element having the characteristics of a constant resistance network for phase cancellation in a carrier recovery network. These and other objects of this invention are accomplished in a semiconductor device utilizing bipolar transistor construction with ohmic contacts disposed on a base material of one semiconductor type and a substrate of a second semiconductor type. The ohmic contacts may be located on a N-type base material with an emitter junction, base junction and collector junction located on the material between the ohmic contacts. In operation, the electric field between the emitter and collector is varied by applying a voltage across the ohmic contacts. A signal which is to be phase shifted is supplied at the emitter junction and a bias is applied at the base to enhance the injection of charge carriers from the emitter The input signal at the emitter junction is phase shifted since the application of the electric field at the ohmic contacts causes the travel time of the charge carriers from the emitter to the collector to vary. As a result, a phase change in the signal outputted at the collector junction occurs. This phase change can be regulated by adjusting the electric field between the emitter and the collector as a function of the voltage applied across the ohmic contacts.

In the use of the linear phase shifting element for a carrier recovery network, the input signal is supplied to the emitter junction from the AFC loop as a 64 MHz signal. The control signal supplied to the ohmic contacts is received from the phase detector and the output from the other ohmic content is supplied to the divide by 4 network.

This invention will be discussed in greater detail with respect to the drawings and the description of the preferred embodiment which follows.

DESCRIPTION OF THE PREFERRED EMBODIMENT

Figure 2:
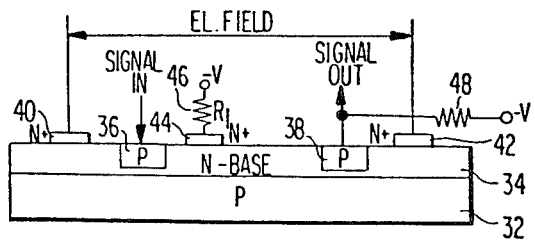
FIG. 2 is a schematic side view of the semiconductor phase canceller in accordance with this invention.

Referring now to FIG. 2, a elevation schematic view of the semiconductor element in accordance with this invention is shown. A linear phase shifting element can in general be approximated by a semiconductor device having the characteristics of a constant resistance network. For example, a semiconductor amplifier such as a bipolar or field effect device will operate as a delay element. In the case of a bipolar transistor minority carriers emitted from the emitter must cross a base region before they are collected at the collector. In the case of a field effect transistor, a finite time is needed for the carriers to travel from the source to the drain. The velocity of the carrier and the distance between emitter and collector determine the time of travel in each case. The distance between the emitter and the collector can therefore be selectively varied, increased or decreased, to satisfy a required phase shift for a given voltage. Increased distance results in increased attenuation but can be compensated for by amplification. Moreover, for a given distance, the electric field between the emitter and collector can be varied to change the travel time.

As shown in FIG. 2, the semiconductor device utilizes a substrate material of one conductivity type, for example a P-type semiconductor 32 with a base 34 of an opposite conductivity type material. Two junctions are provided, an emitter junction 36 and a collector junction 38. Although shown schematically, in an actual device, these junctions would be very shallow relative to the N-layer 34. Junctions 36 and 38 are of a conductivity type material opposite to that of the base 34. Hence, if the base 34 is an N type semiconductor, the junctions 36 and 38 will be a P-type. Ohmic contacts 40 and 42 are provided on the base 34 on opposite sides of the junction 36 and 38. A base contact 44 is employed to forward bias the emitter junction 36 through a resistor 46 for efficient ejection of carriers into the base.

The phase canceller of this invention can be made utilizing well known semiconductor fabrication techniques. For example, the N+ ohmic contacts on either side of the P junctions where the electric field is applied and the N+ ohmic contact forming the base control region may be evaporated regions on an N− base epitaxial layer. An epitaxial layer is preferred to a diffusion because of its uniformity. The emitting and collecting P-junctions are diffused regions having a shallow depth so that the carriers injected by the emitter into the N-region flow under the influence of the electric field. The N-region itself can be formed by ion implementation so that more control on the diffusion profiles is achieved. For the present application, the amount of delay is controlled by the electric field having an absolute level that is always adjustable so that no elaborate process control is necessary.

The velocity of the emitted minority carriers is largely determined by the electric field applied to the two ohmic contacts 40 and 42 on the N silicon on the opposite sides of the P junctions 36 and 38. Once the carriers are injected into the base, they drift to the collector 38 by the electric field applied between the two N+ ohmic contacts 40 and 42. The collector must be reversed bias through a resistor 48 to efficiently collect carriers.

As shown in FIG. 2, both junctions are shallow with respect to the layer 34 to improve the drift occasioned as a result of the applied electric field. If an enhancement type field-effect device is used a voltage must be applied to the gate to establish the channel between source and drain.

Two factors determine the time delay of the minority carriers between the emitter 36 and the collector 38 in such a bipolar structure. First, the applied electric field and second, the diffusion time. Holes emitted in the N-base region 34 require a finite amount of time to diffuse to the collector 38. For a high electric field, the current flow due to diffusion can be neglected. This factor must be minimized in order to achieve linear variation of phase with applied field. The transit time $\tau$ of the carriers from the emitter 36 to the collector 38 can be defined as:

$$\tau = d/\mu_0 E_0$$

where, d is the distance between the emitter and the collector, $\mu_0$ is the drift mobility of holes and, $E_0$ is the applied field. The drift mobility for large fields in a silicon semiconductor material is in the order of 1600 $cm^2$/volt-second. The phase shift associated can then be determined by $\phi = \tau \omega$ radians. If for example d=0.1 cm and $E_0$=10 volts/cm for an input frequency of, 10 MHz, when $\tau=6.25\mu$ sec. It is apparent that with existing semiconductor fabrication techniques a device as shown schematically in FIG. 2 can be easily constructed. Moreover, the transit time formula indicates that an increase of applied field will result in a decrease of phase shift and consequently a higher drift velocity.

Figure 1:
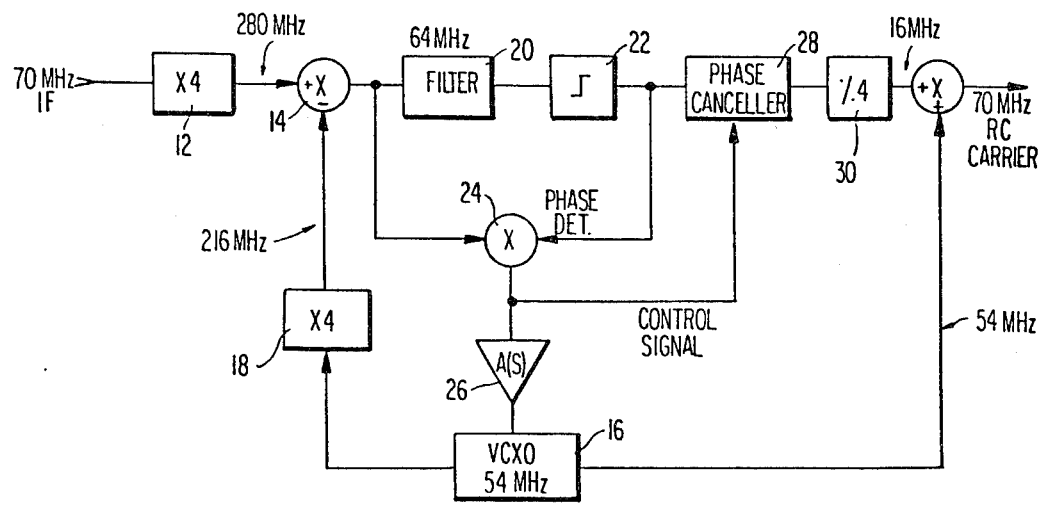
FIG. 1 is a schematic block diagram of a carrier recovery network loop employing the phase canceller of this invention.

As shown in FIG. 2, the semiconductor phase canceller can be utilized as a component in the carrier recovery network as shown in FIG. 1. The control signal is derived, as shown in FIG. 1 at the output of the phase detector and supplied to one N+ ohmic contact. The complete circuit of the phase canceller is shown schematically in FIG. 3 wherein like elements are denoted with like numbers.

Figure 3:
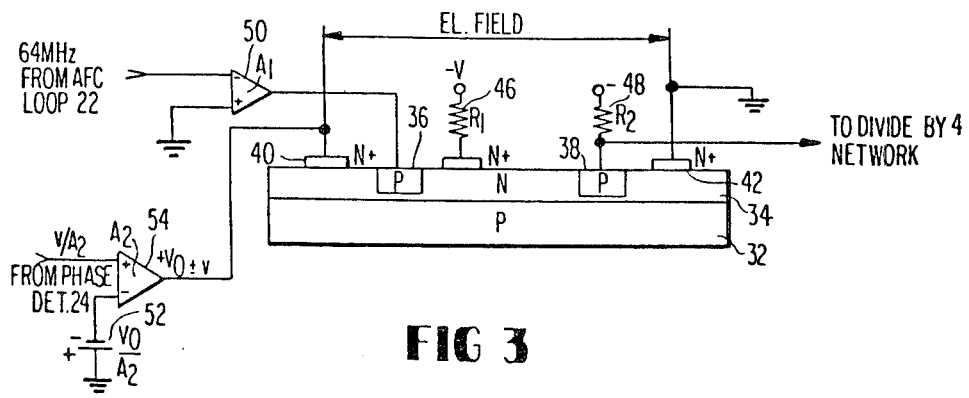
FIG. 3 is a schematic side view of the semiconductor phase canceller of this invention as incorporated into the carrier recovery network loop.

As shown in FIG. 3, the semiconductor phase canceller utilizes a first input at the emitter junction 36 from the AFC loop and in particular the threshold detector 22. This input signal, comprising a 64 MHz signal is first delivered to an amplifier 50 acting as a buffer stage. Amplifier 50 also acts, as shown as an inverter to compensate for a constant 180° phase shift across the device. Such a phase shift is introduced into the device by the voltage source 52 which provides one input to amplifier 54. The phase shift is increased or decreased by the polarity and magnitude of the voltage v from the phase detector 24. This voltage is derived as a signal v/A from the output of the phase detector and amplifier 54 produces a constant phase shift in the form of a signal $+V_0 \pm v$.

If the phase detector 24 output corresponds to a positive phase shift of, for example $\phi_1$, this will correspond to a voltage of $V_0+(v)(\phi_1)$ across the device. The phase shift across the junctions 36 and 38 will be reduced by $\phi_1$, that is, $(180-\phi_1)°$. Same holds true for a negative phase shift of $\phi_1$, in which case the phase shift across the junctions 36 and 38 will correspond to $(180+\phi_1)°$.

As indicated, amplifier 50 acts as a buffer stage as well as an inverter to compensate for the constant 180° phase shift across the device. Amplifier 54 supplies this 180° phase shift across the device plus variations associated with phase shifts at the output of the phase detector 24. Amplifier 54 also serves the purpose of isolating the phase detector 24 from the phase cancelling element 28.

For example, at 64 MHz, 180° phase shift corresponds to a delay of $\tau=\phi/\Omega$. Or $\tau=\pi/2\pi \times 64 \times 10^6 = 7.8$ n sec.

This delay corresponds to a drift voltage of 8 volts/cm for a distance of 0.1 cm between the junctions 36 and 38.

Accordingly, the phase canceller in accordance with this invention can be made utilizing manufacturing techniques common to bipolar or unipolar transistors with two ohmic contacts on either sides of the junction where the electric field is applied. It can be therefore inexpensively manufactured.

In accordance with the present invention a simple phase cancelling network can be interposed in a carrier recovery network to cancel most all phase shifts associated with the 64 MHz band pass filter. Such a phase cancelling network reduces the error in terms of bit error rates which may be as high as 1 dB in a TDMA operation when the 70 MHz IF changes. By utilizing a semiconductor device size and cost are reduced when compared with that of existing phase shifting devices. It is apparent that changes in modification of this invention can be made without departing from the essential scope of the invention.

I claim:

1. Apparatus for cancelling phase shifts in a signal having frequency variations and associated phase shifts comprising, a substrate formed of a first type of semi conductor material, a base region formed of a second semiconductor material adjacent to said first semiconductor material, a pair of junctions formed in said base region, one of said junctions receiving said signal and acting as an emitter of minority carriers in said base region, the other of said junctions acting as a collector, and a pair of ohmic contacts on said second semiconductor material and disposed on opposite sides of said respective emitter and collector junctions wherein an applied electric field between said ohmic contacts caused emitted minority carriers injected into said base at said emitter junction to drift toward said collector at a controlled rate determined by said applied electric field to vary the phase shift of said signal across said apparatus.

2. The apparatus of claim 1 further comprising means to forward bias said emitter junction to improve the injection of carriers into said base region.

3. The apparatus of claims 1 or 2 further comprising means to reverse bias said collector junction to improve collection of carriers.

4. The apparatus of claim 1 further comprising buffer amplifier means for inverting said signal prior to applying said signal to said emitter junction.

5. The apparatus of claims 1 or 4 further comprising means for varying said applied electric field and, amplifier means receiving the output of said means for varying said applied electric field for providing a constant phase shift across said apparatus.

6. The apparatus of claim 5 wherein said means to vary said applied electric field comprises a phase detector and wherein said signal having frequency variations is received from an automatic frequency control loop that includes said phase detector.

* * * * *

UNITED STATES PATENT AND TRADEMARK OFFICE
CERTIFICATE OF CORRECTION

PATENT NO. : 4,438,355
DATED : March 20, 1984
INVENTOR(S) : Vasil Uzunoglu

It is certified that error appears in the above-identified patent and that said Letters Patent is hereby corrected as shown below:

Column 3, line 59, following "emitter" insert -- . --.

Column 5, line 44, change "when" to -- then --.

Signed and Sealed this

Sixth Day of November 1984

[SEAL]

Attest:

GERALD J. MOSSINGHOFF

Attesting Officer

Commissioner of Patents and Trademarks